April 15, 1941.                    E. EGER                    2,238,216
                METHOD OF MANUFACTURING ANTISKID DEVICES
                     Filed Dec. 16, 1937        3 Sheets-Sheet 1
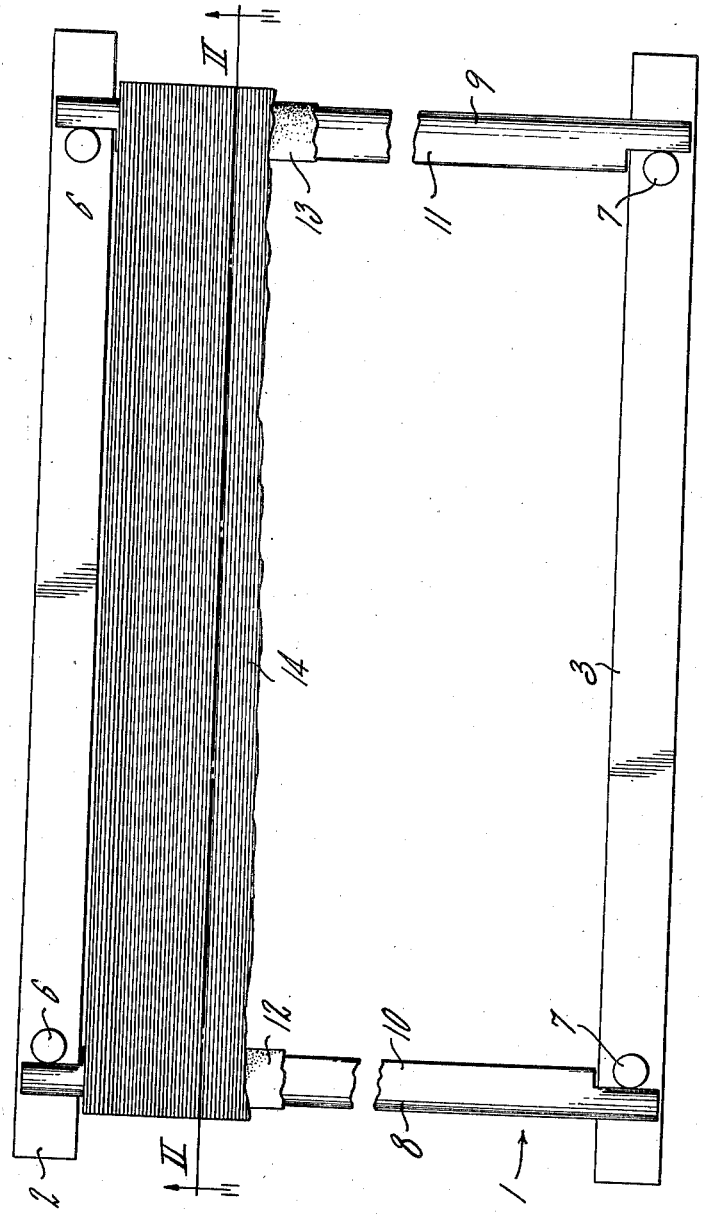
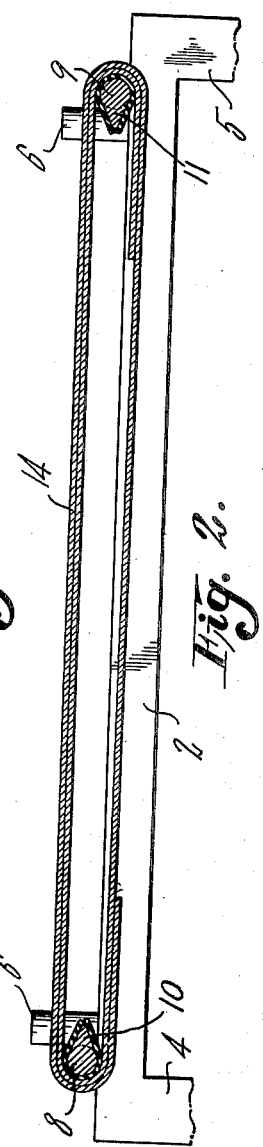
INVENTOR.
ERNST EGER
BY *Gourley & Budlong*
ATTORNEYS.

April 15, 1941.     E. EGER     2,238,216
METHOD OF MANUFACTURING ANTISKID DEVICES
Filed Dec. 16, 1937     3 Sheets-Sheet 2
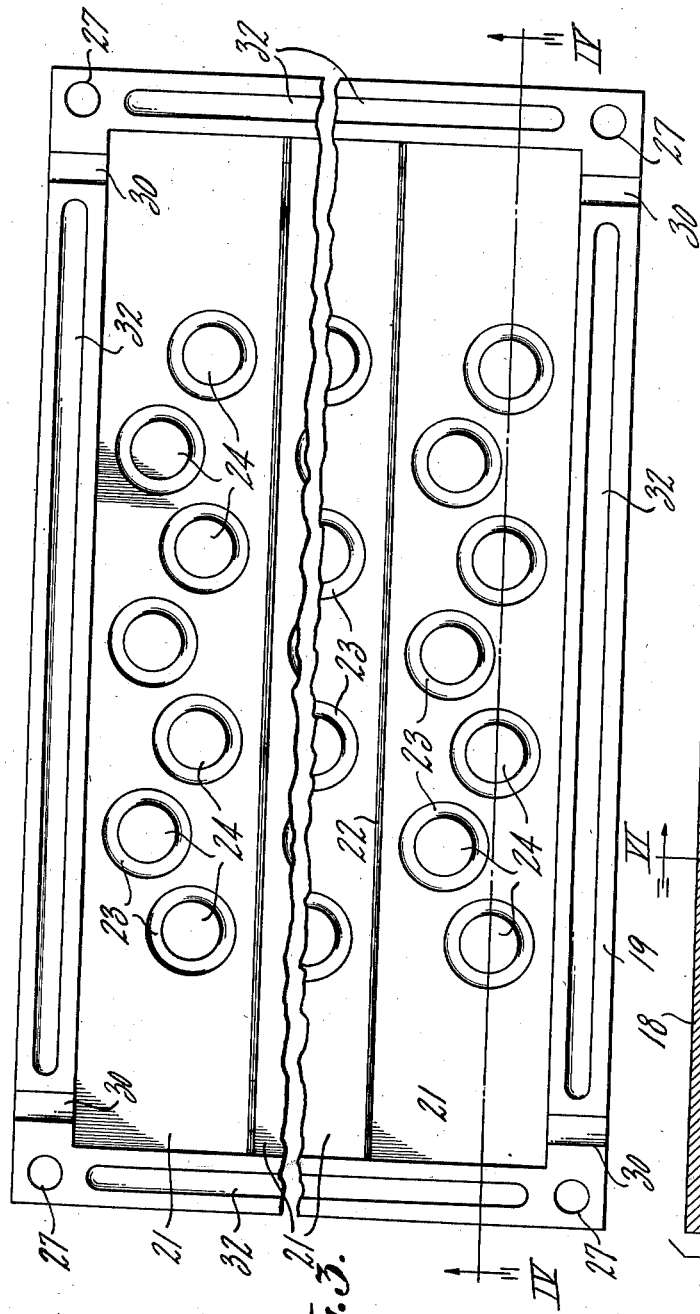
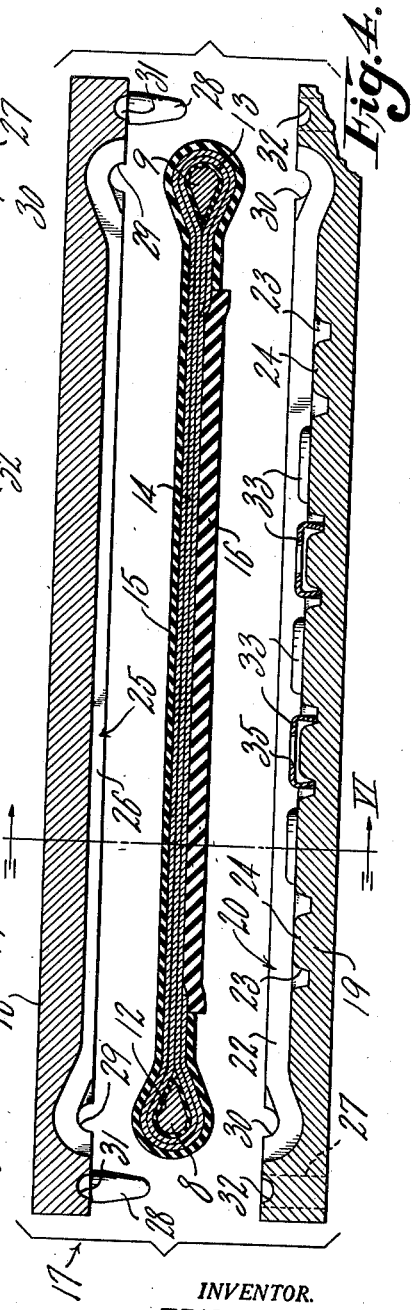
INVENTOR.
ERNST EGER
BY
ATTORNEYS.

April 15, 1941.  E. EGER  2,238,216
METHOD OF MANUFACTURING ANTISKID DEVICES
Filed Dec. 16, 1937   3 Sheets-Sheet 3
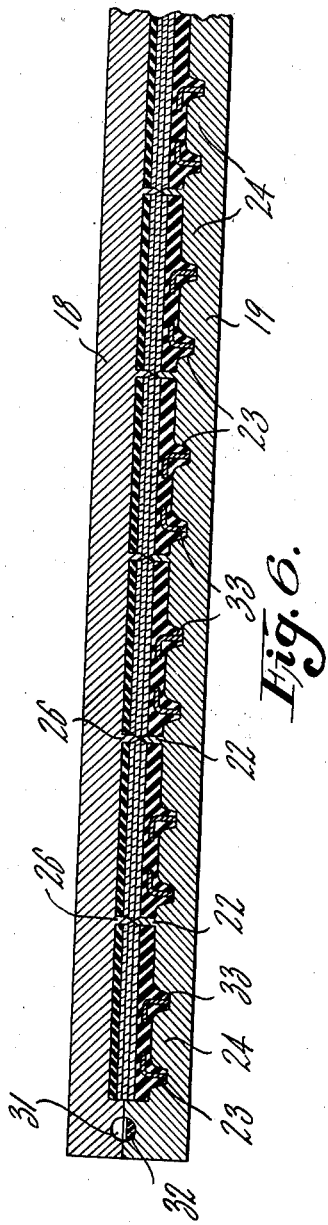
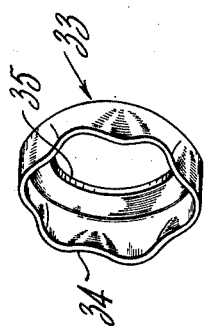
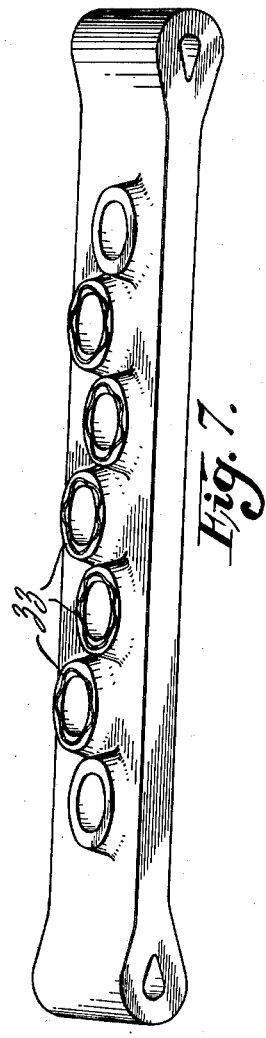
INVENTOR.
ERNST EGER
BY Gourley & Budlong
ATTORNEYS.

Patented Apr. 15, 1941

2,238,216

UNITED STATES PATENT OFFICE 2,238,216

METHOD OF MANUFACTURING ANTISKID DEVICES

Ernst Eger, Grosse Pointe Park, Mich., assignor, by mesne assignments, to United States Rubber Company, New York, N. Y., a corporation of New Jersey Application December 16, 1937, Serial No. 180,111

5 Claims. (Cl. 154—2)

This invention relates to tire antiskid straps, and particularly to a process of manufacturing them. More particularly, the invention relates to a process for manufacturing improved antiskid straps of rubber and cord fabric construction provided with bosses having metallic antiskid inserts.

The method and apparatus employed in this process is primarily intended for manufacturing antiskid devices disclosed in my prior Patent No. 2,099,006, granted November 16, 1937.

Among the objects of the invention are, to provide an efficient and economical method for manufacturing antiskid straps by permitting a unit assembly of antiskid elements to be divided in the molding operation into a plurality of independent antiskid units, and to provide means, cooperable with the molding operation, for assembling the antiskid units.

These and other objects and advantages appear more fully in the following detailed description, when considered in connection with the accompanying drawings, in which—

Fig. 1 is a fragmentary plan view of apparatus illustrating a method of assembling antiskid strap elements;

Fig. 2 is a view thereof, in section, taken on section line II—II of Fig. 1;

Fig. 3 is a fragmentary plan view of a lower mold section used for forming antiskid straps;

Fig. 4 is an exploded view, in section, of mold sections and an assembled antiskid strap, the lower mold section being taken along section line IV—IV of Fig. 3;

Fig. 5 is a perspective view of an insert employed in the present invention;

Fig. 6 is a view, in section, of an antiskid strap assembled with a mold, the section being taken on line VI—VI of Fig. 4; and Fig. 7 is a perspective view of antiskid strap produced by the present process.

With reference to Figs. 1 and 2, I show a frame 1 on which component parts of an antiskid strap are assembled prior to vulcanization. The frame 1 comprises a pair of horizontal rails 2 and 3 from which legs 4 and 5 extend downwardly. The rails are maintained in fixed spaced relation with each other. A plurality of studs 6 and 7 project from the extremities of the upper side of the rails 2 and 3, respectively. A pair of spacer rods 8 and 9 have their ends positioned on top of the rails 2 and 3, and are prevented from moving toward each other by the studs 6 and 7. In section, the rods 8 and 9 are substantially cylindrical. However, tapered projections 10 and 11 extend from the rods 8 and 9, respectively, for the purpose of forming suitable openings at the ends of the straps.

The first step in assembling the elements forming the antiskid strap is the application of strips of rubber 12 and 13 to the rods 8 and 9, respectively. The purpose of these layers of rubber is to form a protective coating on the walls of the aperture, formed by the rods, at the ends of the antiskid straps. Before applying the strips of rubber, the rods 8 and 9 may be coated with a lubricant, such as soapstone, to prevent adhesion of the rubber to the rods.

The body portion of the antiskid straps is formed of fabric looped around the rods 8 and 9 forming reaches therebetween, as shown in Fig. 2. The number of layers of fabric wrapped around the rods may vary in accordance with the degree of strength required for the particular strap. The present illustration provides three layers of fabric 14 looped around the rods 8 and 9 from a continuous length of fabric in less than two complete convolutions to provide the main body of the antiskid strap. Preferably the wrapping is arranged to permit an overlap in the region of the strap ends, resulting in a fabric reinforcement in these regions.

The fabric employed in the assembly of the antiskid strap is preferably in the form of a cord fabric in which the cords extend in parallel relation and in a direction representing the length of the strap. The cords are rubberized, as by dipping the fabric in a rubber solution such as a latex composition or a rubber solvent composition. For reasons hereinafter explained, it is desirable that no weft cords be utilized in the construction of the fabric. The cords are preferably held in their parallel relation by the rubber treatment to which the fabric is subjected. Because of the rubberized condition of the fabric, its surface is of a tacky nature and the various layers of fabric, when assembled, readily adhere to form a unitary construction.

A thin sheet of rubber 15 (Fig. 4) is arranged about the rubber fabric 14 in a manner to cover one side and both ends of the strap. The reaches of the fabric 14 and the sheet of rubber 15 are pressed together and are retained in adjacent relation owing to their comparatively adhesive nature. A materially thicker sheet of rubber 16 to form the tread portion, is secured to the opposite side of the strap. The length of the strip of rubber 16 is such that its ends terminate in adjacent relation with the ends of the thinner strip of rubber 15. After the elements forming the strap unit are pressed or stitched together the strap assembly is complete.

The mold 17 comprises upper and lower mold sections 18 and 19, respectively. The lower section 19 includes a cavity 20 divided into a plurality of compartments 21 by partitions 22. In each of the compartments 21 are disposed a plurality of systematically arranged annular recesses 23 which form bosses 24 extending from the mold section 19. The upper section of the mold 18 has a plain flat cavity 25 divided by partitions 26 into a plurality of compartments which are in complementary relation with the compartment in the lower mold section 19. The lower mold section 19 is provided with holes 27 in the corners thereof for the reception of dowel pins 28 extending from the upper mold section, so that the respective mold cavities will register in proper alignment. The upper mold section 18 and the lower mold section 19 are provided with grooves 29 and 30, respectively, near the ends thereof for the reception of the ends of the rods 8 and 9. The sections 18 and 19 of the mold are provided with overflow basins 31 and 32.

In order to produce the antiskid device of this process, metal inserts 33, as illustrated in Fig. 5, are employed. Each insert 33 comprises a substantially cup-shaped member having a corrugated edge 34, and having an aperture 35 at the base portion.

As depicted in Fig. 4, the inserts 33, after having been prepared for vulcanization to rubber, are placed in the annular recesses 23, in which position the corrugated edges 34 of the inserts engage with the bosses 24. The bases and lower portions of the side walls of the cup-shaped inserts 33 are slightly spaced from the top of the boss 24 to provide for the partial filling of the inserts with rubber for the purpose set forth in the Patent No. 2,099,006.

After the inserts 33 have been placed in the lower mold section 19, the assembled rubber and fabric unit is arranged in the lower mold section with the ends of the rods 8 and 9 in the grooves 29 and 30. The upper mold section is then pressed down over the assembly 23, and in registry with the lower mold section.

The partitions 26 and 22 in the upper and lower mold sections, respectively, are provided with sharp edges; and as pressure is applied on the mold sections the assembly is severed into a plurality of individual antiskid straps. As previously stated, the reinforcement of the straps is made up of parallel cords which extend parallel with the edges of the partitions 26 and 22. This arrangement facilitates the separation of the assembly into a plurality of individual straps as the parallel cords move away from the edge of the partitions when the mold sections are closed.

The mold in its closed position is placed in a vulcanizing press of the platen type, and the assembly is subjected to vulcanization. While the mold is in the press the rubber flows and completely fills the mold cavities. The rubber also flows into the apertures of the inserts, and the corrugations at the sides of the inserts permit the rubber to extend to the ends of the cup-shaped inserts.

After vulcanization the mold sections are parted and the rods 8 and 9 are removed from the ends of the straps. The resulting product is a plurality of individual antiskid straps such as that shown in Fig. 7.

While I have shown and described a preferred method of practicing the invention, it is to be understood that I contemplate all those reasonable variations in practice which appear within the scope of the appended claims.

Having thus described my invention, what I claim and desire to protect by Letters Patent is:

1. The method of forming antiskid devices for tires comprising the steps of wrapping a plurality of layers of fabric around a pair of spaced supports, applying a rubber covering to the fabric layers, placing the assembled rubber and fabric unit and the spaced supports in a multiple cavity mold, closing the mold while simultaneously and substantially severing the assembled rubber and fabric unit into a plurality of individual antiskid devices, vulcanizing the rubber, and removing the spaced supports from the antiskid devices.

2. The method of forming antiskid devices for tires comprising the steps of wrapping a plurality of layers of fabric of parallel extending cords around a pair of spaced supports, applying a rubber covering to the fabric layers, placing the assembled rubber and fabric unit and the spaced supports in a multiple cavity mold, closing the mold while simultaneously and substantially severing the assembled rubber and fabric unit into a plurality of individual antiskid devices, vulcanizing the rubber, and removing the spaced supports from the antiskid devices.

3. The method of forming antiskid devices for tires comprising the steps of wrapping a plurality of layers of fabric of parallel extending cords around a pair of spaced supports, applying a rubber covering to the fabric layers, placing the assembled rubber and fabric unit and the spaced supports in a multiple cavity mold, closing the mold while simultaneously and substantially severing the assembled rubber and fabric unit along a line substantially parallel to the cords to form a plurality of individual antiskid devices, vulcanizing the rubber, and removing the spaced supports from the antiskid devices.

4. The method of forming antiskid devices for tires comprising the steps of wrapping a layer of rubber around each of a pair of spaced supports, wrapping a plurality of layers of fabric around the pair of spaced supports, applying a rubber covering to the fabric layers, placing the assembled rubber and fabric unit and the spaced supports into a multiple cavity mold, closing the mold while simultaneously and substantially severing the assembled rubber and fabric unit into a plurality of individual antiskid devices, vulcanizing the rubber, and removing the spaced supports from the antiskid devices.

5. The method of forming antiskid devices for tires comprising the steps of wrapping a plurality of layers of fabric around a pair of spaced supports, applying an uncured rubber covering to the fabric layers, assembling metallic inserts in mold recesses, placing the assembled rubber and fabric unit and the spaced supports in a multiple cavity mold containing said recesses, closing the mold while simultaneously and substantially severing the assembled rubber and fabric unit into a plurality of individual antiskid devices along the mold cavity edges, causing the metal inserts to become embedded in the rubber portion of the rubber and fabric unit, vulcanizing the rubber, and removing the spaced supports from the antiskid devices.

ERNST EGER.